(12) United States Patent
Cossu et al.

(10) Patent No.: US 10,392,501 B2
(45) Date of Patent: Aug. 27, 2019

(54) RUBBER MIX TO PRODUCE TYRES

(71) Applicant: BRIDGESTONE CORPORATION, Tokyo (JP)

(72) Inventors: Giancarlo Cossu, Rome (IT); Pasquale Agoretti, Ariccia (IT)

(73) Assignee: BRIDGESTONE CORPORATION, Chuo-ku, Tokyo (JP)

( * ) Notice: Subject to any disclaimer, the term of this patent is extended or adjusted under 35 U.S.C. 154(b) by 0 days.

(21) Appl. No.: 15/317,610

(22) PCT Filed: Jun. 11, 2015

(86) PCT No.: PCT/IB2015/054431
§ 371 (c)(1),
(2) Date: Dec. 9, 2016

(87) PCT Pub. No.: WO2015/189803
PCT Pub. Date: Dec. 17, 2015

(65) Prior Publication Data
US 2017/0130037 A1 May 11, 2017

(30) Foreign Application Priority Data
Jun. 11, 2014 (IT) .............................. RM2014A0307

(51) Int. Cl.
| C08K 5/37 | (2006.01) |
| B60C 1/00 | (2006.01) |
| C08L 7/00 | (2006.01) |
| C08J 3/22 | (2006.01) |
| C08K 3/04 | (2006.01) |
| C08K 3/06 | (2006.01) |
| C08K 5/3492 | (2006.01) |
| C08L 9/00 | (2006.01) |
| C08L 61/04 | (2006.01) |

(52) U.S. Cl.
CPC .............. *C08L 7/00* (2013.01); *B60C 1/0016* (2013.01); *C08J 3/22* (2013.01); *C08K 3/04* (2013.01); *C08K 3/06* (2013.01); *C08K 5/34922* (2013.01); *C08K 5/37* (2013.01); *C08L 9/00* (2013.01); *C08L 61/04* (2013.01); *C08J 2307/00* (2013.01); *C08J 2415/00* (2013.01); *C08L 2312/04* (2013.01)

(58) Field of Classification Search
CPC .................................. C08K 5/37; B60C 1/0016
See application file for complete search history.

(56) References Cited

U.S. PATENT DOCUMENTS

| 3,638,702 A | * | 2/1972 | Endter | ................. B60C 1/0016 152/209.1 |
| 4,162,354 A | * | 7/1979 | Pearson | ................. B29C 71/04 522/127 |
| 2010/0108239 A1 | | 5/2010 | Recker et al. | |

FOREIGN PATENT DOCUMENTS

| CN | 1769353 A | 5/2006 |
| EP | 2 703 186 A1 | 3/2014 |
| JP | 2013087271 A | * 5/2013 |
| KR | 10-2011-0073058 A | 6/2011 |

OTHER PUBLICATIONS

Machine translation of JP 2013-0387271 A, published May 13, 2013. (Year: 2013).*
Communication dated Nov. 13, 2017 from the State Intellectual Property Office of the P.R.C. in counterpart Chinese application No. 201580030414.1.
Written Opinion of the International Searching Authority of PCT/IB2015/054431 dated Oct. 13, 2015.
International Search Report of PCT/IB2015/054431 dated Oct. 13, 2015.

* cited by examiner

*Primary Examiner* — Vickey Nerangis
(74) *Attorney, Agent, or Firm* — Sughrue Mion, PLLC

(57) ABSTRACT

A rubber mix for tires including at least one cross-linkable polymer base, a reinforcing filler, a vulcanization system, a reinforcing resin and a dithiol chemical according to the formula SHRSH, wherein, in the formula, R is an aliphatic or aromatic group composed of 3 to 12 atoms.

9 Claims, No Drawings

RUBBER MIX TO PRODUCE TYRES

CROSS REFERENCE TO RELATED APPLICATIONS

This application is a National Stage of International Application No. PCT/IB2015/054431 filed Jun. 11, 2015, claiming priority based on Italian Patent Application No. RM2014A000307 filed Jun. 11, 2014, the contents of all of which are incorporated herein by reference in their entirety.

TECHNICAL FIELD

The present invention concerns a rubber mix to produce tyres.

BACKGROUND ART

Here and below by the expression "masterbatch mixing step" we mean a mixing step in which the polymer base is mixed with the other ingredients of the mix except for the vulcanization system.

Here and below by the expression "methylene donor chemical" we mean a chemical able to function as a cross-linking agent by means of methylene bridges in the presence of a "methylene acceptor" chemical.

On the market there is an increasing demand for tyres with low rolling resistance. In said regard, part of the research in the field of tyres is concentrated on finding solutions able to provide a low rolling resistance, without compromising the other tyre characteristics, for example the mechanical characteristics.

One of the possibilities of obtaining improvements in terms of rolling resistance is to reduce the quantity of reinforcing filler in the mix. However, reduction of the reinforcing filler normally results in a deterioration of the mechanical characteristics of the mix, such as the tensile strength, for example.

The need was therefore felt to improve the rolling resistance characteristics of a mix by reducing its quantity of reinforcing filler, without this entailing a deterioration of the mechanical characteristics of the mix.

For a more complete understanding of the present invention, it should be highlighted that long-term thermal and mechanical stability of the component rubber mixes is a particularly important characteristic for tyres.

It is known that the use of peroxide-based vulcanization systems or the so-called Efficient Vulcanization (EV) systems, characterised by a sulphur/accelerator ratio in favour of the latter, guarantees greater long-term thermal and mechanical stability to the detriment of process flexibility and fatigue resistance. Differently, the Conventional Vulcanization (CV) systems, characterised by a sulphur/accelerator ratio to the disadvantage of the latter, guarantee greater flexibility at the production stage and a greater fatigue resistance, but to the detriment of the long-term thermal and mechanical stability.

The Applicant has surprisingly devised a solution which allows a reduction in the quantity of reinforcing filler in the mix without deteriorating the mechanical characteristics and, at the same time, an improvement in the long-term stability characteristics of the mix.

DISCLOSURE OF INVENTION

The subject of the present invention is a rubber mix comprising at least one cross-linkable polymer base, a reinforcing filler and a vulcanization system; said mix being characterised in that it comprises a reinforcing resin and a dithiol chemical with formula (I)

$$SHRSH \quad (I)$$

wherein R is an aliphatic or aromatic group composed of 3-12 atoms.

Preferably, the dithiol chemical has the formula $SH(CH_2)_nSH$ where n is in the range between 3 and 12.

Preferably, the dithiol chemical is $SH(CH_2)_6SH$.

Preferably, the dithiol chemical is present in the mix in a quantity ranging from 0.5 to 20 phr.

Preferably, said reinforcing resin is a single-component resin added to the compound being prepared together with said vulcanization system.

Preferably, said reinforcing resin is a two-component resin; a methyl acceptor chemical of said two-component resin being added to the mix in preparation in a masterbatch mixing step and a methylene donor chemical being added to the mix in preparation together with said vulcanization system.

Preferably, said reinforcing resin is comprised in the group consisting of acrylic resins, alkyd resins, amine resins, amide resins, maleimide resins, maleic resins, epoxy resins, furan resins, phenolic resins, phenol formaldehyde resins, polyamide resins, polyester resins, urethane resins, vinyl resins, vinyl ester resins, cyanoacrylic resins, silicone resins, siloxane resins, melamine resins, urea-formaldehyde resins and fumaric resins.

Preferably, said reinforcing resin is present in the mix in a quantity ranging from 1 to 50 phr.

Preferably, the reinforcing filler is present in the mix in a quantity ranging from 5 to 30 phr.

A further subject of the present invention is a tyre portion produced with a mix subject of the present invention.

Preferably, said portion is a tread.

A further subject of the present invention is a tyre comprising a portion produced with a mix subject of the present invention.

BEST MODE FOR CARRYING OUT THE INVENTION

For a better understanding of the invention, embodiment examples are given below purely for illustrative non-limiting purposes.

Examples

Four comparison mixes were produced (Mixes A-D) and a mix according to the present invention (Mix E).

The comparison mixes can be described as follows: Mix A is a standard compound without the dithiol chemical and without the reinforcing resin; Mix B differs from Mix A due to the fact that it has half the quantity of carbon black; Mix C has the same quantity of carbon black as Mix B and comprises the dithiol chemical but not the reinforcing resin; Mix D also has the same quantity of carbon black as Mix B and comprises the reinforcing resin but not the dithiol chemical.

The mix produced according to the principles of the present invention (Mix E) differs from the comparison mixes due to the fact that it has half the quantity of carbon black, and comprises both the reinforcing resin and the dithiol chemical.

The Mixes A-E were prepared according to the procedure described below.

—Preparation of the Mixes—

(1st Mixing Step—Masterbatch)

Prior to the beginning of the mixing, the polymer base, the carbon black and the methylene acceptor chemical of the reinforcing resin were loaded in a mixer with tangential rotors and internal volume ranging from 230 to 270 liters, reaching a filling factor ranging from 66 to 72%.

The mixer was operated at a speed ranging from 40 to 60 r.p.m., and the mixture formed was discharged once a temperature ranging from 140 to 160° C. had been reached.

(2nd Mixing Step)

The mixture obtained from the preceding step was mixed again in the mixer operated at a speed ranging from 40 to 60 r.p.m. and, subsequently, discharged once a temperature ranging from 130 to 150° C. had been reached.

(3rd Mixing Step)

The vulcanization system consisting of sulphur and accelerators, the dithiol chemical and the methylene donor chemical of the reinforcing resin was added to the mixture obtained from the preceding step, reaching a filling factor ranging from 63 to 67%.

The mixer was operated at a speed ranging from 20 to 40 r.p.m. and the mixture formed was discharged once a temperature ranging from 90 to 110° C. had been reached.

Differently from the procedure described above, the dithiol chemical and the reinforcing resin, regardless of whether it is single-component or two-component, can be added to the mix in the masterbatch mixing step, taking certain precautions to avoid the cross-linking reaction.

Table I shows in phr the compositions of the mixes.

TABLE I

| Compound | A | B | C | D | E |
|---|---|---|---|---|---|
| Natural rubber | 70.0 | 70.0 | 70.0 | 70.0 | 70.0 |
| Butyl rubber | 30.0 | 30.0 | 30.0 | 30.0 | 30.0 |
| Carbon black | 40.0 | 20.0 | 20.0 | 20.0 | 20.0 |
| Dithiol chemical | — | — | — | 5.0 | 5.0 |
| Phenol formaldehyde | — | — | 15.0 | — | 15.0 |
| HMMM | — | — | 5.0 | — | 5.0 |
| Sulphur | 2.5 | 2.5 | 2.5 | 2.5 | 2.5 |
| Accelerator | 0.6 | 0.6 | 0.6 | 0.6 | 0.6 |

The carbon black used is N234.

The Phenol Formaldehyde and HMMM (hexamethoxymethylamine) are respectively the methylene acceptor chemical and the methlyene donor chemical of the two-component reinforcing resin.

The dithiol chemical used is $SH(CH_2)_6SH$.

The accelerator used is N-tert-butyl-2-benzothiazylsulfenamide (TBBS).

Experimental Tests

The mixes, once vulcanized, underwent experimental tests to ascertain the advantages of the mix according to the present invention with respect to the comparison mixes.

In particular, the mixes underwent tests relative to the mechanical and dynamic properties. The mechanical properties were measured according to the ASTM D412C standard, while the dynamic properties were measured according to the ISO 4664 standard.

As is known to a person skilled in the art, the rolling resistance parameter is strictly correlated with the hysteresis values: the lower the hysteresis value, the better the rolling resistance.

For an evaluation of the stability of the mixes, they underwent an "ageing" procedure during which the mixes were kept at a temperature of 100° C. for six days in compliance with the ISO 188 standard.

Table II shows the values of the experimental tests carried out. The hysteresis and toughness values were indexed to the values of the comparison mix A, while the long-term stability values are expressed in percentage terms with respect to the datum recorded on said mix in the absence of ageing (the higher the index, the better the property).

TABLE II

| Compound | A | B | C | D | E |
|---|---|---|---|---|---|
| Hysteresis | 100 | 130 | 120 | 120 | 130 |
| Toughness | 100 | 65 | 100 | 100 | 110 |
| Toughness after 6 days of ageing | 40 | 55 | 55 | 60 | 90 |

As can be seen from the data given in Table II, the synergic effect due to the combination of a reinforcing resin and a dithiol chemical guarantees both an improvement in terms of rolling resistance, without compromising the mechanical tensile properties, and, above all, an even more surprising improvement in terms of long-term stability.

The comparison Mixes C and D confirm that an only partial condition of the above-mentioned combination is not able to guarantee the advantages described above.

In particular, the effect of the above-mentioned synergy in the stability of the mixes is extremely surprising. In fact, the comparison mixes show that the sole presence of the reinforcing resin (Mix C) or the sole presence of the dithiol chemical (Mix D) result in a much lower stability of the respective mixes than what is obtained with the combined presence of a reinforcing resin and the dithiol chemical.

To conclude, the combined presence of a reinforcing resin and a dithiol chemical allows the quantity of reinforcing filler to be reduced without compromising the mechanical characteristics and, surprisingly, guarantees high values in terms of long-term stability of the mix.

The invention claimed is:

1. A rubber mix comprising at least one cross-linkable polymer base, a reinforcing filler, a vulcanization system, a reinforcing resin, and a dithiol chemical represented by formula (I):

$$SH(CH_2)_nSH \qquad (I),$$

wherein, in formula (I), n is an integer ranging from 3 to 12;
said dithiol chemical is present in the mix in a quantity ranging from 5 to 20 phr;
said reinforcing filler is present in the mix in a quantity ranging from 5 to 30 phr;
said reinforcing resin is present in the mix in a quantity ranging from 1 to 50 phr;
said reinforcing resin is a two-component resin; and
a methyl acceptor chemical of said two-component resin is added to the mix in preparation in a masterbatch mixing step and a methylene donor chemical is added to the mix in preparation together with said vulcanization system.

2. The rubber mix according to claim 1, characterised in that the dithiol chemical is $SH(CH_2)_6SH$.

3. The rubber mix according to claim 1, wherein said reinforcing filler is a carbon black.

4. The rubber mix according to claim 1, wherein said vulcanization system comprises sulphur and a vulcanization accelerator.

5. The rubber mix according to claim 1, wherein said reinforcing filler is present in the mix in the quantity ranging from 5 to 20 phr.

6. The rubber mix according to claim 1, wherein said reinforcing resin is present in the mix in the quantity ranging from 20 to 50 phr.

7. A tyre portion produced with a mix according to claim 1.

8. A tyre comprising the portion according to claim 7.

9. A tyre tread produced with a mix according to claim 1.

* * * * *